United States Patent Office 3,213,137
Patented Oct. 19, 1965

3,213,137
ORTHO-AMINOPHENYLACETAMIDE SEDATIVES
Alexander B. Neill, Norwich, N.Y., assignor to
The Norwich Pharmacal Company
No Drawing. Filed Oct. 1, 1962, Ser. No. 227,592
3 Claims. (Cl. 260—558)

This application is a continuation-in-part of my copending application, Serial No. 762,696, filed September 23, 1958, and now abandoned, and is filed as a substitute therefor.

This invention relates to the alleviation of disturbances of central nervous system origin in human beings. In particular, this invention aims to provide a new method of alleviating agitative and hyperactive disturbances of central origin, and a series of new closely related sedatives that are useful in the practice of that method.

I have discovered that pharmaceutical compositions containing, as active ingredient, an ortho-aminophenylacetamide which may be represented by the formula:

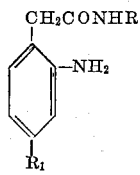

in which

R is a member of the group consisting of hydrogen and lower alkyl, and
$R_1$ is a member of the group consisting of hydrogen and chlorine and pharmaceutically acceptable acid addition salts thereof, exhibit a surprising effect in alleviating disturbances of central nervous system origin which cause untoward agitation and hyperactivity.

In accordance with the practice of my invention, a sedative comprising an ortho-aminophenylacetamide corresponding to the formula depicted above, or a pharmaceutically acceptable acid addition salt thereof, is associated with a suitable pharmaceutical carrier for ready administration to a patient. Such a carrier may be a solid vehicle, a suspension or a sterile parenteral liquid. Suitable solid compositions comprise tablets, powders and capsules having the active agent incorporated therein. Suitable liquid compositions include suspensions and solutions of the active agent. For parenteral administration, the active agent may be dissolved in sterile distilled water or isotonic saline.

Exemplary compositions prepared according to my invention comprise the following:

FORMULATION I
(Tablet)

| Ingredient: | Parts by weight in mgms. |
|---|---|
| Ortho-aminophenylacetamide | 300.0 |
| Cornstarch | 90.7 |
| Milk sugar | 8.3 |
| Magnesium stearate | 1.0 |

FORMULATION II
(Parenteral solution)

| Ingredient: | Parts by weight in grams |
|---|---|
| Ortho-aminophenylacetamide | 1.25 |
| Sterile isotonic saline | 98.75 |

FORMULATION III
(Tablet)

| Ingredient: | Parts by weight in mgms. |
|---|---|
| 2-(2 - amino-4-chlorophenyl)-N - methylacetamide | 200.0 |
| Cornstarch | 90.8 |
| Milk sugar | 8.2 |
| Magnesium stearate | 1.0 |

FORMULATION IV
(Tablet)

| Ingredient: | |
|---|---|
| N-Methyl-2-aminophenylacetamide | 50.00 |
| Cornstarch | 90.95 |
| Milk sugar | 8.05 |
| Magnesium stearate | 1.00 |

FORMULATION V
(Suspension)

| Ingredient: | Parts by weight in grams |
|---|---|
| 2-(2 - Amino-4-chlorophenyl)-N-methylacetamide | 5.00 |
| Sodium carboxymethylcellulose | 0.75 |
| Water | 94.25 |

FORMULATION VI
(Parenteral solution)

| Ingredient: | |
|---|---|
| Ortho-aminophenylacetamide hydrochloride | 2.0 |
| Sterile distilled water | 98.0 |

It will be readily apparent to those skilled in the art that the foregoing exemplary compositions provide means for supplying varying dosages of active ingredient through the use of a plurality of the unit dosage form or fractional parts thereof as by scored tablets and that such exemplary compositions do not necessarily represent a rigorous or in every instance an invariable dosage amount.

I have found that administration of the compositions of my invention alleviates agitative and hyperactive disturbances of central origin under a daily dosage regimen of the order of about 400 to about 1000 mg. thereof.

While my compositions exhibit, in general, a similarity of pharmacological behavior, they vary somewhat in their degree of activity depending on the identity of the active ingredient selected. The compositions which I currently regard as preferable contain, as the active ingredient thereof, the compound 2-(2-amino-4-chlorophenyl)-N-methylacetamide. Other compounds that exhibit outstanding pharmacological activity are ortho-aminophenylacetamide and N-methyl-2-aminophenylacetamide.

My compositions are relatively non-toxic. No manifestation of toxic symptoms has accompanied their administration at therapeutic levels.

The compounds forming the sedative agents in the compositions employed in the practice of my invention may be readily obtained through a series of chemical reactions involving steps which those skilled in the art will readily appreciate. Briefly these consist of preparing the corresponding nitro-acid; treatment thereof to form the acid chloride; reaction therewith of the appropriate amine to yield the amide and reduction by hydrogenating in the presence of a catalyst such as palladium-on-charcoal or platinum oxide. Any of the bases so prepared can be converted into the corresponding pharmaceutically acceptable acid addition salt thereof by dissolving such base in an aqueous solution containing a stoichiometric quantity of an acid such as hydrochloric, sulfuric, tartaric, phosphoric or citric acid.

In order that the methods which I now prefer for making the active ingredients of my compositions may be readily available, the following examples are briefly described:

EXAMPLE I

*Ortho-aminophenylacetamide*

A 5 l., three-neck flask is fitted with a stirrer, thermometer, manometer connection and an inlet tube for hydrogen. The apparatus is tested for leaks in the following manner: A vacuum is applied to the flask, the stirrer is started and any fluctuations in the pressure are noted and corrected while the flask is still under reduced pressure. The stopcock to the vacuum pump is turned off. Nitrogen gas is allowed to enter the flask until slightly positive pressure (ca. 20 mm.) is observed on the manometer. Again any changes in the pressure are corrected. Once free of leaks the closed system is ready for the addition of reagents.

Into the flask are now added 416 g. (2.3 moles) of o-nitrophenylacetamide [Ann. 471:113 (1929)] and 2000 ml. of distilled water. The catalyst, 100 g. of 5 percent palladium-on-carbon, is slurried with 200 ml. of water and added to the flask. The system is flushed three times with nitrogen by evacuating the flask and then filling with nitrogen. The flask is now ready for use.

With the stirrer turned off the flask is evacuated with a water pump and then filled with hydrogen. This procedure is carried out twice to remove any nitrogen which might remain in the flask. After the second evacuation, hydrogen is allowed to enter the flask until a slight positive pressure is indicated on the manometer. A pressure reading (65 lbs.) on the reservoir gauge located between the hydrogen source and the reaction flask is recorded and also room temperature and temperature of the contents of the flask. The stirrer is started and the needle valve on the reservoir is adjusted so as to maintain a slight positive pressure (10–20 mm.) in the flask during the hydrogenation. The hydrogenation takes approximately six hours. The reaction temperature is allowed to rise to 55–60° and is maintained at this temperature by means of a heated water-bath or steam.

When the reaction is finished as evidenced by no further uptake of hydrogen, the flask is flushed with nitrogen three times as before and the catalyst filtered off. To the hot filtrate is added 44 g. of sodium metabisulfite (to make a 2 percent sodium bisulfite solution). The solution is cooled and the white precipitate filtered and sucked dry. The precipitate is then dried at 65° for eight hours. This dry precipitate is then recrystallized from approximately 500 ml. of 1,4-dioxane. The slightly pink crystals which are collected are washed with ether to remove the pink color. The crystals thus obtained have a melting point of 108–111° and $$E_{1\%}^{1cm.} \; 467 \; \text{at} \; 2325 \; A. \; \text{in water}$$

On concentration of the filtrate more crystals are obtained which are added to the main crop. A total of approximately 188 g. of the desired o-aminophenylacetamide is obtained.

EXAMPLE II

*N-methyl-2-aminophenylacetamide*

(A) N-METHYL-2-NITROPHENYLACETAMIDE

Into a 22 l., three-neck flask fitted with a stirrer and condenser is placed 4530 g. (25 m.) of crude o-nitrophenylacetic acid [Ann. 403:188 (1914)] and 4000 g. (33.6 m.) of practical thionyl chloride. This mixture is stirred and heated in a water-bath at 35–40° C. After the solid has liquefied the mixture is heated for three hours at the same temperature. During this time copious quantities of hydrogen chloride and sulfur dioxide are evolved. Excess thionyl chloride is removed under water pump vacuum for about one hour at 35–40°. Half the dark residue (about 1950 ml.) is added through a dropping funnel into 4 kg. of cooled 40% monomethylamine solution contained in a 12 l. three-neck flask. The contents of the flask are stirred and cooled in a salt-ice bath. The addition is completed in about two hours. Then the mixture is placed in the refrigerator overnight. The precipitate is filtered, washed with water and dried at 65° C. The other half of the material is treated as above. The crude amide weighs approximately 4950 g. The amide is dissolved in 220 lbs. of boiling water, treated with 3 lbs. of activated charcoal and filtered through a funnel using a filter-aid. The filtrate is cooled to approximately 15° C. overnight. The precipitate is then filtered, washed with water and dried in the oven. The product weighs about 1952 g. (40%).

(B) N-METHYL-2-AMINOPHENYLACETAMIDE

The hydrogenation of the product of (A) is conducted in a 12 l., three-neck flask fitted with stirrer, thermometer, U-shaped manometer, hydrogen gas inlet tube and connection to a vacuum pump. The flask is heated with a water-bath. The system is first checked to insure that there are no leaks. N-methyl-2-nitrophenylacetamide (955 g.) is added to the reaction flask along with 4500 cc. of isopropanol. The catalyst (200 g. of 5% palladium-on-carbon) is wet with 1000 cc. isopropanol and then added to the flask. The system is evacuated twice and each time filled with nitrogen. It is then evacuated three times and each time filled with hydrogen gas. The system is now ready for hydrogenation. At first the reaction goes on quite slowly, but when the internal temperature reaches 40° C. the hydrogenation goes quite rapidly. During the reaction the water-bath is maintained at 45–48° C. and the inner temperature below 56° C. The hydrogenation is complete in 2 to 3½ hours. When the reaction is completed, which is indicated by a drop of temperature and a slowing down of hydrogen absorption, the reaction mixture is cooled to room temperature and the catalyst filtered off.

The alcohol is removed with a water pump. The yellow solid which is obtained and which weighs about 930 g. is dissolved in 2.5 l. of 10% HCl solution (precooled). This acid solution is treated with Darco and extracted with chloroform (2 x 1000 cc.). Then the acid solution is transferred to a battery jar, fitted with a stirrer and cooled. The acid is neutralized with a saturated $Na_2CO_3$ solution (1.25 l.). The white precipitate is filtered, washed with a minimum amount of cold water and dried (475 g.).

The filtrate from the above is extracted with chloroform (3 x 1000 cc.) and the chloroform evaporated off. The residue is again dissolved in 250 cc. of 10% HCl solution, extracted with chloroform and treated with Darco. More product precipitates when the acid solution is neutralized with 175 cc. of saturated $Na_2CO_3$ solution. The precipitate (104 g.) is filtered, washed with water and dried.

A like procedure is again applied to the filtrate using less solvents and reagents, 75 cc. of 10% HCl solution and 60 cc. of saturated $Na_2CO_3$ solution to yield further product (36 g.).

The total yield is 615 g. (74%) of N-methyl-2-aminophenylacetamide; M.P. 89–90° C.

EXAMPLE III

*N-ethyl-2-aminophenylacetamide*

(A) N-ETHYL-2-NITROPHENYLACETAMIDE

This compound is prepared analogously to the compound of Example II, A. using ethylamine instead of monomethylamine.

(B) N-ETHYL-2-AMINOPHENYLACETAMIDE

The product of (A) (20.5 g.) is hydrogenated in 150 cc. of ethanol in the presence of 0.1 g. of platinum oxide. The hydrogenation is completed in 32 minutes. The catalyst is filtered and solvent removed by a water pump. The crude material, recrystallized from isopropyl ether, gives 16.1 g. of N-ethyl-2-aminophenylacetamide; M.P. 90–91° C.

Similarly prepared are N-propyl-2-aminophenylacetamide, M.P. 69–70° C., using propylamine and N-isopropyl-2-aminophenylacetamide, M.P. 134–135° C., using isopropylamine in step A.

EXAMPLE IV

*2-(2-amino-4-chlorophenyl)-N-methylacetamide*

(A) 2-(2-NITRO-4-CHLOROPHENYL)-N-METHYL-ACETAMIDE 2-nitro-4-chlorophenylacetic acid (7200 gms.) [J.A.C.S. 78:221 (1956)] and thionyl chloride (10.650 g.) are mixed in a 22 l., three-neck flask fitted with stirrer, condenser and thermometer and warmed with a water-bath at 40–45° C. for 3½ hours. Excess thionyl chloride is removed with a water pump. The dark oily residue is added through two dropping funnels into two 22 l. flasks containing equal amounts of pre-cooled monomethylamine solution (40%). Total methylamine used is 21,000 g. Salt-ice baths are used during the reaction for cooling purposes. The mixture is stirred for three more hours and then filtered, washed with 2 x 4 l. of cold water and dried. The crude product weigh 13 lb. (5850 g.) after drying at 60° C. This is recrystallized from methyl alcohol (180 lb.) and activated charcoal (1 lb.) in a 50 gal. kettle. The over-all yield is 54.2%; M.P. 181–182° C.

(B) 2-(2-AMINO-4-CHLOROPHENYL)-N-METHYL-ACETAMIDE

The product of (A) (1000 g.) is hydrogenated in 6500 cc. of methanol in the presence of 6.8 g. of platinum oxide. In three hours a total of 147.5 lb. of hydrogen is picked up which represents 86.3% of the theory (171 lb.). The inner temperature is allowed to rise from room temperature spontaneously and maintained at 50° C. with a water-bath. The used catalyst is filtered and the alcohol is removed from the filtrate at water pump pressure. The orange residue (approximately 3 l.) is treated with activated charcoal. The filtrate upon cooling yields a white crystalline product which is filtered and washed with a small amount of methanol and ether. The filtrate upon further concentration yields more product. The crude yield amounting to 600 g. (70%) is recrystallized from a mixture of benzene and methyl alcohol (4 to 1 and 1 g. 16.65 cc.) and 563 g. of product is obtained which represents an over-all yield of 65%; M.P. 145–147° C.

EXAMPLE V

*4-chloro-2-aminophenylacetamide*

This compound is prepared in a manner similar to that employed in Example IV, (A) except ammonium hydroxide is used instead of monomethylamine. A 50% yield of product, M.P. 136–138° C., is obtained.

What I claim is:
1. An ortho-aminophenylacetamide having sedative properties, represented by the formula:

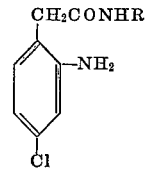

wherein R represents a member of the group consisting of hydrogen and methyl.
2. 2-(2-amino-4-chlorophenyl)-N-methylacetamide.
3. 4-chloro-2-aminophenylacetamide.

References Cited by the Examiner

UNITED STATES PATENTS

| | | | |
|---|---|---|---|
| 2,429,535 | 10/47 | Surrey | 260—558 |
| 2,463,942 | 3/49 | Berhrens | 260—558 |
| 2,874,188 | 2/59 | Micucci et al. | 260—558 |
| 3,056,726 | 10/62 | Marsh | 167—65 |
| 3,057,780 | 10/62 | Shapiro | 167—65 |

OTHER REFERENCES

Beilstein's Handbuch, volume 14, Supp. II, page 279 (1951).

WALTER A. MODANCE, *Primary Examiner.*

MORRIS O. WOLK, NICHOLAS S. RIZZO, *Examiners.*